United States Patent [19]
Ishikawa

[11] Patent Number: 5,375,220
[45] Date of Patent: Dec. 20, 1994

[54] MULTIPROCESSOR SYSTEM INCLUDING A CACHE MEMORY WITH TAG COPY UNITS

[75] Inventor: Tadashi Ishikawa, Tokyo, Japan

[73] Assignee: Kabushiki Kaisha Toshiba, Kawasaki, Japan

[21] Appl. No.: 906,502

[22] Filed: Jun. 30, 1992

[30] Foreign Application Priority Data

Jul. 4, 1991 [JP] Japan ................... 3-164504

[51] Int. Cl.⁵ ................... G06F 13/00; G06F 12/00
[52] U.S. Cl. ................... 395/425; 395/400; 364/DIG. 1
[58] Field of Search ................... 395/425, 400

[56] References Cited

U.S. PATENT DOCUMENTS

| | | | |
|---|---|---|---|
| 4,349,871 | 9/1982 | Lary | 395/800 |
| 4,775,955 | 10/1988 | Liu | 395/425 |
| 4,847,804 | 7/1989 | Shaffer et al. | 395/425 |
| 4,968,977 | 11/1990 | Chinnaswamy et al. | 340/825.8 |
| 4,992,930 | 2/1991 | Gilfeather et al. | 395/425 |
| 5,119,485 | 6/1992 | Ledbetter, Jr. et al. | 395/425 |
| 5,222,224 | 6/1993 | Flynn et al. | 395/425 |
| 5,265,232 | 11/1993 | Gannon et al. | 395/425 |
| 5,265,235 | 11/1993 | Sindhu et al. | 395/425 |

*Primary Examiner*—Glenn Gossage
*Attorney, Agent, or Firm*—Oblon, Spivak, McClelland, Maier, & Neustadt

[57] ABSTRACT

A multiprocessor computer system includes main memories and processors which are connected through a crossbar switching network, and a tag copying mechanism having copies of tags of caches of the processors connected to each main memory. When each of the main memories is updated, a corresponding tag copy is checked to discriminate whether or not an updating request hits the cache having an original tag. Upon detection of a hit, a cancel or invalidate request is sent to the processor which corresponds to the hit cache, and which is not a main memory updating request source, thereby invalidating the corresponding cache line of the cache of that processor.

7 Claims, 3 Drawing Sheets

MULTIPROCESSOR SYSTEM INCLUDING A CACHE MEMORY WITH TAG COPY UNITS

BACKGROUND OF THE INVENTION

1. Field of the Invention

The present invention relates to a multi-processor information processing system, which is constituted by a plurality of main memories and a plurality of processors (central processing units (CPU), microprocessor unit (MPU), direct memory access (DMA), controller and the like) connected through a crossbar switching network to the plurality of main memories so as to share them, and, more particularly, to a cache control system for maintaining data consistency (or coherence) between caches of the processors and the main memories.

2. Description of the Related Art

In an information processing system adopting a main memory sharing type multi-processor scheme, processors are connected to a main memory through a single system bus.

The processing speed of each processor is normally higher than the read/write access speed of the main memory. For this reason, in order to compensate for the speed difference and to increase the speed for accessing desired data, each processor often incorporates a cache (cache memory).

Although the cache size is smaller than the main memory size, since the cache can operate at a speed equal to or slightly slower than that of the processor, deterioration of system performance due to overhead occurring when the processor accesses the low-speed main memory can be prevented by utilizing the cache.

When the number of processors is increased, or when the performance of each processor is improved and the frequency of accessing the main memory is increased, the transfer capability of the bus becomes a bottleneck for the system performance. On the contrary, if a decrease in access speed for the main memories poses a bottleneck problem more serious than that caused by the bus, the main memories may be distributed and connected to the system bus, thus eliminating the bottleneck problem caused by the main memories. However, the bottleneck caused by the bus cannot yet be eliminated.

As a method of solving this problem, the processors and the main memories may be properly connected through switches.

In this arrangement, communications between the plurality of main memories and the plurality of processors can be processed in parallel unless requested addresses of the main memories overlap each other, and the performance of the processors can be sufficiently utilized. For this reason, the bus bottleneck can be eliminated, and a high system throughput can be realized.

However, in order to realize the arrangement for performing the above-mentioned parallel processing, a difficult problem still remains unsolved. This problem is to realize consistency (coherence) or matching between the contents of the caches and the contents of the corresponding main memories. That is, in order to attain cache consistency, main memory updating operations of other processors must be monitored by each processor. However, it is not easy to check all the main memory updating operations which are performed in parallel like in the above-mentioned arrangement.

As a method of monitoring main memory updating operations, all the processors are connected, by means in addition to the crossbar connection, to exchange main memory updating information with each other. With this arrangement, the processors can update their caches. However, this method considerably increases connection hardware resources, and is difficult to apply.

As described above, in a multi-processor information processing system constituted by a plurality of main memories and a plurality of processors, which are connected to each other through a crossbar switching network, in order to attain cache consistency, all the processors must be connected, by means in addition to crossbar connection, to exchange main memory updating information with each other, so that the processors can update their caches. This results in a considerable increase in the number of connection hardware resources.

For this reason, a crossbar connection system is difficult to put into practical application since it cannot easily solve the problem with respect to cache consistency, although it basically has a feature of sufficiently utilizing the performance of the multi-processor system.

SUMMARY OF THE INVENTION

The present invention has been made in consideration of the above situation, and has as its object to provide a cache control system capable of matching the contents of caches of processors and those of main memories with a simple arrangement in a multi-processor information processing system, constituted by connecting a plurality of main memories and a plurality of processors through a crossbar switching network.

According to the present invention, in an information processing system constituted by connecting a plurality of main memories and a plurality of processors through a crossbar switching network, a tag copy function is provided to each main memory. Each tag copying mechanism stores copies of tags of the caches of the processors. Every time the storage content of a given main memory is updated, the tag copies stored in the tag copying mechanism connected to this main memory are checked, thus discriminating whether or not the updated content is stored in (or hits) caches associated with the tag copies. Upon detection of a cache hit, invalid message information, including a line number of a corresponding cache line and a line cancel (or invalidate) instruction, is sent to a processor, which is not a main memory updating request source, of cache-hit processors each having the cache which stores the updated content. Thus, the corresponding cache line of the cache-hit processor is invalidated.

Furthermore, according to the present invention, every time a read request from a processor to a main memory is generated, the tag copying mechanism connected to the main memory updates a tag copy associated with the read request source processor on the basis of a read request address.

In the above arrangement, the tag copying mechanisms having tag copies of the caches of the processors are connected to connection ports by crossbar switches and the main memories. The tag copies are similar to those used for bus snoop in the case of a common bus arrangement. Only tag copies of portions corresponding to address spaces assigned to the respective main memories are distributed at I/O ports of the main memories.

When a write request (main memory updating request) is input from a given processor to a main memory to which a tag copying mechanism is connected, the tag copying mechanism checks tag copies stored therein to discriminate whether or not the request hits the caches of processors associated with the tag copies. If a cache hit is detected, the tag copying mechanism returns a write request address and a line cancel instruction to the cache-hit processor. Upon reception of the cancel instruction, the processor invalidates the corresponding cache line of the cache.

The address to be returned from the tag copying mechanism to the processor does not require all the bits of the write request address, but can consist of only bits capable of identifying a line of a write-hit cache, i.e., a line number.

Of the hit-detected processors, the cache of a write request source processor is not inconsistent with the write destination main memory. For this reason, the cache of the write request source processor need not be canceled (or invalidated). It is preferable to inhibit a cancel (invalidate) instruction to the write request source processor so as to maintain a high cache hit rate. The cancel instruction inhibition processing can be realized by comparing processor identifiers to discriminate whether or not the write request source processor is a processor having the original tag.

When a read request from a given processor is sent to a given main memory, since the cache in the given processor mishits, data read out from the given main memory according to the read request will be registered in the cache sooner or later. In this case, a copy of the tag of this cache is updated based on the read request address, thus automatically generating a copy of the tag of the cache of the processor in the tag copying mechanism.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1:
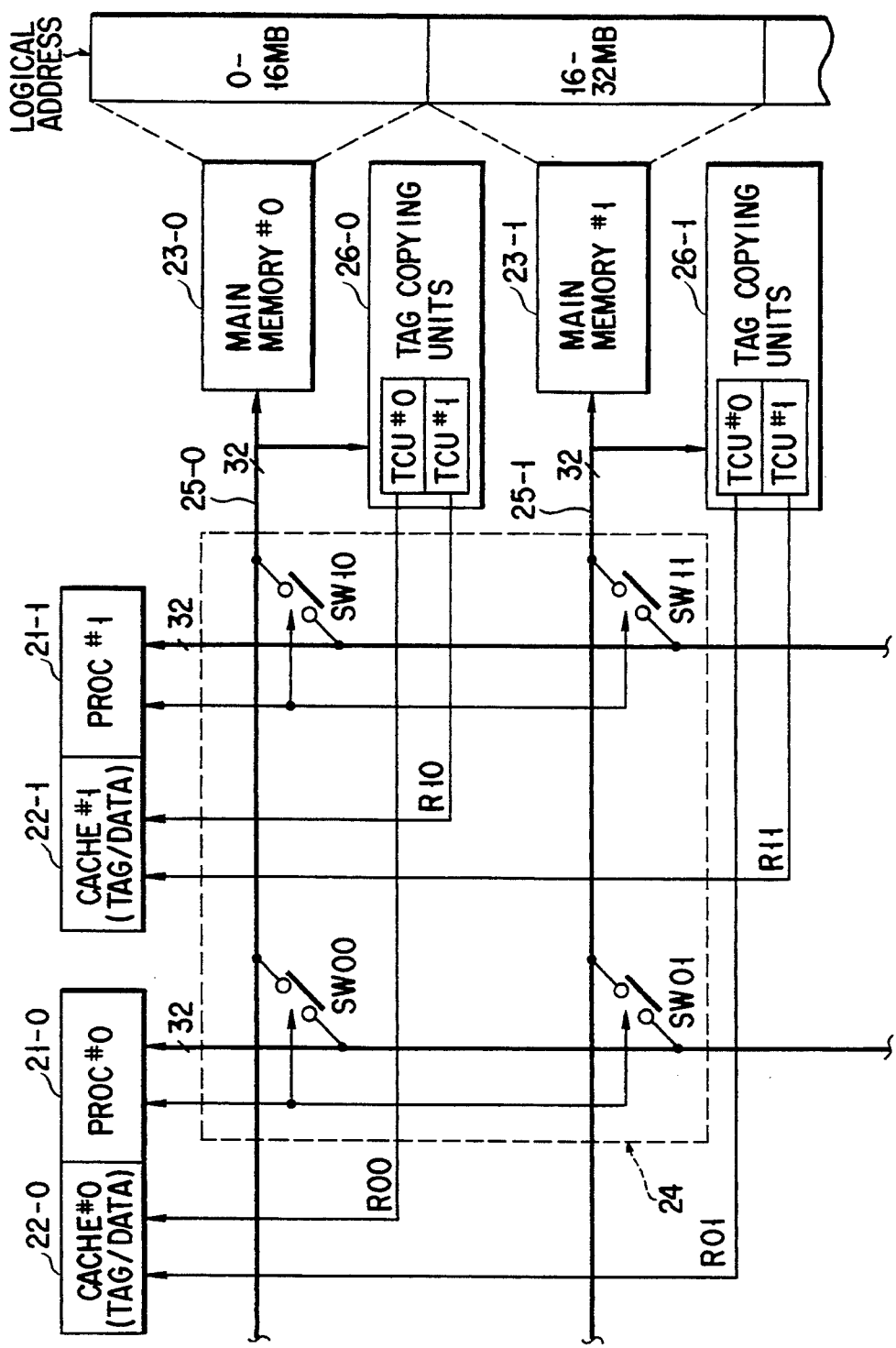
FIG. 1 is a block diagram showing an arrangement of a computer system according to an embodiment of the present invention, in which two main memories and two processors with caches are coupled through a crossbar switching network.

FIG. 1 shows the arrangement of a computer system according to an embodiment of the present invention. For the sake of easy understanding, two main memories and two processors are used.

In FIG. 1, 32-bit processor #0 (21-0) comprises its own cache memory #0 (22-0), and 32-bit processor #1 (21-1) comprises its own cache memory #1 (22-1). Each of cache memories #0 and #1 includes a storage area for storing data and/or commands, and a storage area for storing tags (to which information for specifying the source of cached data/command is entered) indicating sources of data stored in the cache memory.

Processor #0 (23-0) is connected to main memories #0 and #1 (23-1) through switch SW00 or SW01 in crossbar switching network 24, and processor #1 is connected to main memories #0 and #1 through switch SW10 or SW11 in crossbar switching network 24. Main memories #0 and #1 each have a storage capacity of 16 megabit or (MB), and constitute a 32-MB main memory device as a whole.

Processors #0 and #1 shown in FIG. 1 can independently access arbitrary addresses of the 32-MB main memory device.

When processor #0 accesses an address range between 0 to 16 MB (logical addresses $000000 to $ffffff in hexadecimal notation), it is connected to main memory #0 by turning on switch SW00; when it accesses an address range between 16 to 32 MB ($1000000 to $1ffffff), it is connected to main memory #1 by turning on switch SW01.

Similarly, when processor #1 accesses the address range between 0 to 16 MB, it is connected to main memory #0 by turning on switch SW10; when it accesses the address range between 16 to 32 MB, it is connected to main memory #1 by turning on switch SW11.

Switches SW00 to SW11 are ON/OFF-controlled by an OS (operating system) or an application program, which operates on processors #0 and #1.

Tag copying mechanism 26-0 is connected to 32-bit bus 25-0 for connecting main memory #0 to processor #0 or #1. Tag copying mechanism 26-1 is connected to 32-bit bus 25-1 for connecting main memory #1 to processor #0 or #1.

Tag copying mechanism 26-0 includes tag copying unit TCU#0 for copying the content of tags in cache #0, and tag copying unit TCU#1 for copying the content of tags in cache #1. Similarly, tag copying mechanism 26-1 includes tag copying unit TCU#0 for copying the content of tags in cache #0, and tag copying unit TCU#1 for copying the content of tags in cache #1.

TCU#0 in mechanism 26-0 sends information (R00) for invalidating a cache under a predetermined condition to cache #0, and TCU#1 in mechanism 26-0 sends similar information (R10) to cache #1. TCU#0 in mechanism 26-1 sends information (R01) for invalidating a cache under a predetermined condition to cache #0, and TCU#1 in mechanism 26-1 sends similar information (R11) to cache #1.

There are four connection patterns between processors #0 and #1 and main memories #0 and #1, as follows:

(1) When switches SW00 and SW11 are ON and switches SW01 and SW10 are OFF:

In this pattern, processor #0 is connected to main memory #0 through bus 25-0, and processor #1 is connected to main memory #1 through bus 25-1.

In this case, the content of main memory #0 is not rewritten by processor #1, and the content of main memory #1 is not rewritten by processor #0. Therefore, mismatching between the contents of cache #0 and main memory #0 does not occur, and mismatching between the contents of cache #1 and main memory #1 does not occur.

Furthermore, since processors #0 and #1 are independently connected to main memories #0 and #1 through two buses 25-0 and 25-1, the buses for connecting the processors and main memories substantially serve as a 64-bit bus, and the bus speed can be twice that of a 32-bit bus.

(2) When switches SW01 and SW10 are ON and switches SW00 and SW11 are OFF:

In this pattern, processor #0 is connected to main memory #1 through bus 25-1, and processor #1 is connected to main memory #0 through bus 25-0.

In this case, the content of main memory #0 is not rewritten by processor #0, and the content of main memory #1 is not rewritten by processor #1. Therefore, mismatching between the contents of cache #0 and main memory #1 does not occur, and mismatching between the contents of cache #1 and main memory #0 does not occur.

Furthermore, since processors #0 and #1 are independently connected to main memories #1 and #0 through two buses 25-0 and 25-1, the buses for connecting the processors and main memories substantially serve as a 64-bit bus, and the bus speed can be twice that of a 32-bit bus.

(3) When switches SW00 and SW10 are ON and switches SW01 and SW11 are OFF:

In this pattern, processor #0 is connected to main memory #0 through bus 25-0, and processor #1 is also connected to main memory #0 through bus 25-0.

In this case, since the content of main memory #0 can be rewritten by both processors #0 and #1, mismatching between the contents of cache #0 or #1 and main memory #0 may occur.

For example, assume a case after processor #0 reads out given data from logical address $10000 of main memory #0, and the data is stored in cache #0.

In this case, when processor #1 writes some data at logical address $10000 of main memory #0, data stored in cache #0 does not match (i.e., the cache is not consistent or coherent) with the content at logical address $10000 (this state is mentioned as a state in which data in cache #0 has become dirty data).

In this case, when processor #0 tries to read the content at logical address $10000 without knowing that the content at logical address $10000 has been changed, since the content is present in cache #0 (cache hit), processor #0 executes the subsequent processing using data (dirty data) in cache #0.

Then, the system shown in FIG. 1 yields a wrong result which is not intended by the program running therein, or causes system hang-up or a program runaway state.

Such trouble can be eliminated by invalidating a cache line including dirty data in cache #0 before processor #0 reads the content at logical address $10000, which content has been changed before processor #0 knows it.

In order to invalidate the cache line, means for detecting whether or not the content at logical address $10000 of main memory #0 is rewritten is required. This means is represented by TCU#0 arranged in tag copying mechanism 26-0.

More specifically, TCU#0 has copies of tags of data registered in cache #0, and always monitors an access of processor #0 or #1 to main memory #0. When processor #1 makes a write access at address $10000 of main memory #0, TCU#0 compares a copy (indicating an address of data registered in cache #0) of a held tag and a write address by processor #1. If matching (hit) is detected, TCU#0 invalidates the cache line including dirty data in cache #0 using signal line R00. In this manner, processor #0 uses the content at address $10000 of main memory #0 without using dirty data in cache #0, and the above-mentioned wrong result or the system hang-up or program runaway state can be prevented.

(4) When switches SW01 and SW11 are ON and switches SW00 and SW10 are OFF:

In this pattern, processor #1 is connected to main memory #1 through bus 25-1, and processor #0 is also connected to main memory #1 through bus 25-1.

In this case, since the contents of main memory #1 can be rewritten by both processors #0 and #1, mismatching between the contents of cache #0 or #1 and main memory #1 may occur.

For example, assume a case after processor #1 reads out given data from logical address $1abcdef of main memory #1, and the data is stored in cache #1.

In this case, when processor #0 writes some data at logical address $1abcdef of main memory #1, data stored in cache #1 does not match with the content at logical address $1abdcef (data in cache #1 becomes dirty data).

In this case, when processor #1 tries to read the content at logical address $1abdcef without knowing that the content at logical address $1abdcef has been changed, a wrong result is obtained or a system hang-up or program runaway state occurs.

Such trouble can be eliminated by invalidating a cache line including dirty data in cache #1 before processor #1 reads the content at logical address $1abcdef, which content has been changed before processor #1 knows it.

In order to invalidate the cache line, means for detecting whether or not the content at logical address $1abcdef of main memory #1 is rewritten is required. This means is TCU#1 arranged in tag copying mechanism 26-1.

More specifically, TCU#1 has copies of tags of data registered in cache #1, and always monitors an access of processor #0 or #1 to main memory #1. When processor #0 makes a write access at address $1abcdef of main memory #1, TCU#1 compares a copy (indicating an address of data registered in cache #1) of a held tag and a write address by processor #0. If matching (hit) is detected, TCU#1 invalidates the cache line including dirty data in cache #1 using signal line R11. In this manner, processor #1 uses the content at address $1abcdef of main memory #1 without using dirty data in cache #1, and the above-mentioned wrong result or the system hang-up or program runaway state can be prevented.

Operations of TCU#0, as a representative example, of tag copying mechanism 26-0 can be summarized as follows.

1) TCU#0 compares tag copies therein, and an address accessed from processor #0 or #1.

2) When mismatching (mishit) is detected:

The accessed content of the main memory is registered in the cache of the processor which made the access.

3) When matching (hit) is detected:

3a) If a read access from processor #0 is made, since this request mishits cache #0, cache #0 is not invalidated, and read data from main memory #0 is registered in cache #0.

3b) If a write access from processor #0 is made, cache #0 is not invalidated, and write data to main memory #0 is registered in cache #0 (by write through).

3c) If a read access from processor #1 is made, read data from main memory #0 is registered in cache #1.

3d) If a write access from processor #1 is made, cache #0 is invalidated, and write data to main memory #0 is registered in cache #1. (In this case, write data to main memory #0 may be registered in cache #0.)

Figure 2:
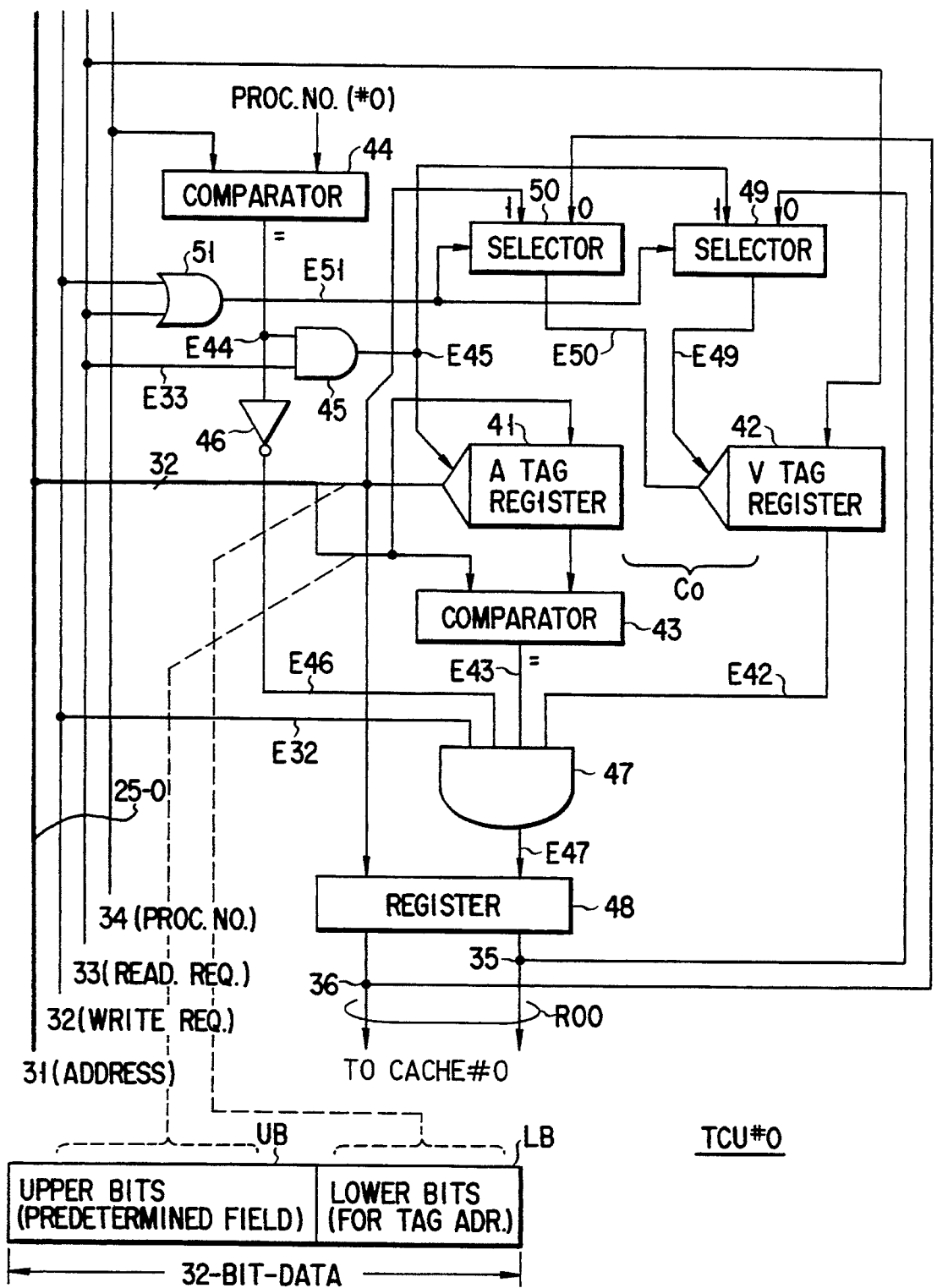
FIG. 2 is a block diagram showing the internal arrangement of each of tag copy units (#0, #1), which are arranged in a tag copying mechanism shown in FIG. 1 in correspondence with the number of processors.

FIG. 2 is a block diagram showing details of, e.g., TCU#0 in tag copying mechanism 26-0 connected to main memory 23-0 in the information processing system shown in FIG. 1. The arrangement of TCU#1 is the same as that of TCU#0.

In FIG. 2, reference numeral 31 denotes a 32-bit signal line for transferring a request address to main memory 23-0; and 32, a 1-bit signal line for transferring a write request to main memory 23-0. Reference numeral 33 denotes a 1-bit signal line for transferring a read request to main memory 23-0; and 34, a signal line (1 bit for a 2-processor system; 4 bits for a 16-processor system) for transferring a processor number (processor identifier) for identifying a processor, which issued a request to main memory 23-0.

Signal line 34 for the processor number is used for, when a given processor makes a write access to main memory 23-0, inhibiting the cache of the given processor from being invalidated, or for, when a given processor makes a read access to the main memory, copying the tag of the cache of the given processor.

Signal lines 31 to 34 described above are included in bus 25-0 (for connecting main memory 23-0 and crossbar switching network 24) shown in FIG. 1.

In FIG. 2, reference numeral 35 denotes a signal line for, when processor 21-1 makes a write access to main memory 23-0, and the write address hits tag copy C0 (described below) in TCU#0, sending a cancel (invalidate) instruction for instructing to cancel a corresponding cache line of cache 22-0 of processor 21-0. Reference numeral 36 denotes a signal line for transferring the line number of the cache line to processor 21-0. Signal lines 35 and 36 are included in signal line R00 shown in FIG. 1.

Reference numeral 41 denotes a register for storing an address portion of a tag for processor 21-0 (to be referred to as an A tag hereinafter); and 42, a register for storing a valid bit portion of the tag for processor 21-0 (to be referred to as a V tag hereinafter). A and V tag registers 41 and 42 shown in FIG. 2 are assumed to comprise Random access memories or RAMs having separated read and write ports for the sake of easy understanding. A and V tag registers 41 and 42 constitute copy tag C0. The tag register 41 stores a copy of a portion, corresponding to an address space assigned to main memory 23-0, of an address portion of a tag of cache 22-0 arranged in processor 21-0. V tag register 42 stores a valid bit portion of this tag.

Reference numeral 43 denotes a comparator for checking if a request address on signal line 31 hits (matches with) the content of A tag register 41, and for, when a hit is detected, outputting signal E43; and 44, a comparator for checking if a request source processor number on signal line 34 hits the processor number of processor 21-0. If a hit is detected, comparator 44 outputs signal E44 of logic "1".

Reference numeral 45 denotes an AND gate for, when signal E44 is at logic "1", detecting read request E33 from processor 21-0 (own processor), and generating signal E45 for setting A tag register 41 in a write enable state; and 46, an inverter for inverting the level of output signal E44 from comparator 44, and outputting inverted signal E46. Reference numeral 47 denotes an AND gate for, when a write request address from a processor (another processor) other than processor 21-0 hits tag copy C0, outputting detection signal E47; and 48, a register for holding detection signal E47 (hit check result) from AND gate 47 as a cancel instruction, and also holding its line number (a line number of a cache memory indicated by a request address on signal line 31). Outputs 35 and 36 from this register 48 are connected to signal line R00.

Reference numeral 49 denotes a selector for selecting one of output E45 from AND gate 45 and the state of signal line 35 (cancel instruction) as write enable signal E49 for V tag register 42; 50, a selector for selecting one of a line number indicated by a request address on signal line 31 or a line number on signal line 36 as input or entry address (line number) E50 of V tag register 42; and 51, an OR gate for, when a write or read request to main memory 23-0 is detected, outputting detection signal E51. The output from OR gate 51 is used as selection control signal E51 for selectors 49 and 50.

Tag copying mechanism 26-0 also includes a circuit portion (not shown) for TCU#1 having the same arrangement as that of the circuit portion for TCU#0 described above. The only difference between the circuits for the two TCUs is the processor number to be input to comparator 44 so as to identify the processor number. TCU#0 and TCU#1 respectively receive corresponding processor numbers #0 and #1.

The same applies to tag copying mechanism 26-1.

The operations, when one of processors 21-0 and 21-1 issues a request to main memory 23-0, of the embodiment shown in FIG. 2 in the cases of (a) write request and (b) read request will be described below in turn.

(a) Processing for write request

When a write request is issued from one of processors 21-0 and 21-1 to main memory 23-0, TCU#0 (TCU#1) of tag copying mechanism 26-0 connected to main memory 23-0 checks if its request address (i.e., a request address on signal line 31) hits tag copy C0 (C1). This hit check operation is performed as follows.

When a read request is issued to main memory 23-0, the corresponding line of A tag register 41 is accessed by the request address on signal line 31, and its tag address is read out to comparator 43. Comparator 43 compares this tag address with predetermined field UB of the request address, and performs hit detection based on the presence/absence of matching between the two data.

When a request (in this case, a read request) is issued to main memory 23-0, output E51 from OR gate 51 holds true (logic "1"). When output E51 from OR gate 51 is at logic "1", selector 50 selects the "1"-side input. As a result, the corresponding line of V tag register 42 is accessed by the request address on signal line 31, thus reading out valid bits.

Comparator 44 compares a processor number on signal line 34 for indicating a write request source, and the processor number (#0) of processor 21-0 (own processor). The level of output signal E44 from comparator 44 is inverted by inverter 46.

Output signal E43 from comparator 43, valid bit E42 read out from V tag register 42, output signal E46 from inverter 46, and write request E32 on signal line 32 are input to AND gate 47. When all these input signals hold true (logic "1"), i.e., when comparator 43 uses the content of A tag register 41 that the request address on signal line 31 hits (E43="1"), when comparator 44 identifies that the write request is not one from its own processor (processor 21-0) (E46="1"), when V tag register 42 indicates that the corresponding cache line is valid (E42="1"), and furthermore, when signal line 32 indicates a write request (E32="1"), AND gate 47 causes its output E47 to hold true. E47="1" indicates that the write request from another processor (processor 21-1) to main memory 23-0 hits tag copy C0 corresponding to own processor (processor 21-0), i.e., it hits the tag of cache 22-0 of processor 21-0, and the corresponding cache line is to be canceled (or invalidated).

Output E47="1" from AND gate 47 is temporarily latched as a cancel or invalidate instruction by register 48 together with the line number indicated by the request address. The cancel or invalidate instruction (35) as the output from register 48 and the line number (36) of the hit cache line are transferred to cache 22-0 through signal line R00.

As a result, cache 22-0 of processor 21-0, which received the cancel instruction, invalidates the cache line indicated by the line number sent through signal line R00.

When no request to be processed is input in a cycle subsequent to the cycle wherein register 48 latches data, output E51 from OR gate 51 holds false ("0"). In this case, selectors 49 and 50 select "0"-side inputs, i.e., the cancel instruction on signal line 35, and the line number on signal line 36. Since V tag register 42 is in a ready state, if an updating request from another processor to main memory 23-0 hits one cycle before, i.e., if the cancel instruction on signal line 36 holds true ("1"), V tag register 42 is set in a write enable state by the output from selector 49.

As a result, status signal E33="0" of the read request signal on signal line 33 is written in a line (entry) of V tag register 42, which line is indicated by the output (the line number of the hit cache line) from selector 50, thereby canceling the valid bits.

In contrast to this, when a new request to be processed is input in a cycle subsequent to the cycle wherein register 48 latches data, and tag copy C0 is used, the valid bits of the corresponding line of V tag register 42 are not canceled, i.e., the corresponding line of tag copy C0 is not invalidated. However, as described above, since the tag of cache 22-0 (i.e., an original of tag copy C0) is canceled by the cancel instruction transferred to processor 21-0 through signal line R00 (signal lines 35 and 36), no inconsistency occurs between main memory 23-0 and cache 22-0, and consistency can be maintained.

In FIG. 2, V tag register 42 comprises a read/write separate type 1-port RAM whose read circuit is separated from its write circuit for the sake of simplicity. When V tag register 42 comprises a dual port RAM or a flip-flop, even when a new request is input in a cycle subsequent to the cycle wherein an updating request from another processor to main memory 23-0 hits, V tag register 42 can be accessed to cancel valid bits.

In the arrangement shown in FIG. 1, the plurality of processors issue updating requests (write requests) to different main memories, and the updating requests may hit the cache of one processor. In this case, the tag copying mechanisms connected to the main memories simultaneously send cancel instructions to the processor.

In order to simultaneously execute cancel (invalidate) instructions from a plurality of tag copying mechanisms, the cache tag of the processor need only have a structure capable of simultaneously invalidating a plurality of lines. In this case, not all the bits of a tag but only valid bits of the tag are to be simultaneously accessed. Thus only the valid bit portion of this tag (corresponding to the content of V tag register 42 in FIG. 2) are simultaneously invalidated.

If a plurality of lines cannot be invalidated due to limitations on hardware resources, and if only one can be invalidated at a time, a buffer for temporarily buffering a plurality of simultaneously generated cancel instructions (and a plurality of line numbers) may be arranged, and the cancel instructions may be sequentially read out from the buffer to invalidate the corresponding lines. Such a buffer may be allocated in register 48 shown in FIG. 2.

(b) Processing for read request

Processing for a read request will be described below. Assume that a read request is issued from processor 21-0 to main memory 23-0. The fact that the read request is issued from processor 21-0 to main memory 23-0 means that cache 22-0 in processor 21-0 mishits, and data read out from main memory 23-0 based on this read request will be registered in cache 22-0 sooner or later. Thus, tag copy C0 (a copy of the tag of cache 22-0 in processor 21-0) in tag copying mechanism 26-0 connected to main memory 23-0 must be updated.

When a read request is input to main memory 23-0 through signal line 33, TCU#0 or TCU#1 in tag copying mechanism 26-0 checks the request source to discriminate whether the request is input from the corresponding processor (own processor). The check operation of the request source is performed as follows in TCU#0 in FIG. 2.

When processor 21-0 issues a read request to main memory 23-0, processor number #0 of the processor which issued the request is transferred to main memory 23-0 through signal line 34. Comparator 44 compares request source processor number #0 on signal line 34 with processor number #0 of processor 21-0 (own processor). When the two processor numbers match with each other, i.e., when it is determined that request source processor 21-0 is the own processor, comparator 44 causes its output E44 to hold true ("1").

If output E44 from comparator 44 goes to logic "1" when read request E33 on signal line 33 is at logic "1", i.e., if it is determined that the request source of read request E33 is processor 21-0 (own processor), output E45 of AND gate 45 goes to logic "1", and A tag register 41 is set in a write enable state. Thus, a tag address designated by a request address on signal line 31 is registered in a line (entry) of A tag register 41 designated by the request address.

At this time, output E51 from OR gate 51 goes to logic "1" according to the read request on signal line 33, and hence, selectors 49 and 50 select the "1"-side inputs, i.e., output E45 (="1") from AND gate 45 and a line number designated by the request address on signal line 31. When output E49 from selector 49 goes to logic "1", V tag register 42 is set in a write enable state. Thus, status (E33="1") of the read request on signal line 33 is written in a line of V tag register 42 designated by output E50 from selector 50. More specifically, valid bits of V tag register 42 designated by the request address on signal line 31 hold true (E42="1").

As described above, in this embodiment, when cache 22-0 in processor 21-0 (own processor) mishits, and a read request to main memory 23-0 is issued, the same updating processing as that performed for the tag of cache 22-0 is performed for tag copy C0 (i.e., for A and V tag registers 41 and 42 constituting tag copy C0) in the circuit portion for processor 21-0 in tag copying mechanism 26-0 connected to main memory 23-0. Thus, tag copy C0 can correctly indicate the status of the tag (i.e., a portion associated with main memory 23-0 of the tag) of cache 22-0 incorporated in processor 21-0.

Figure 3:
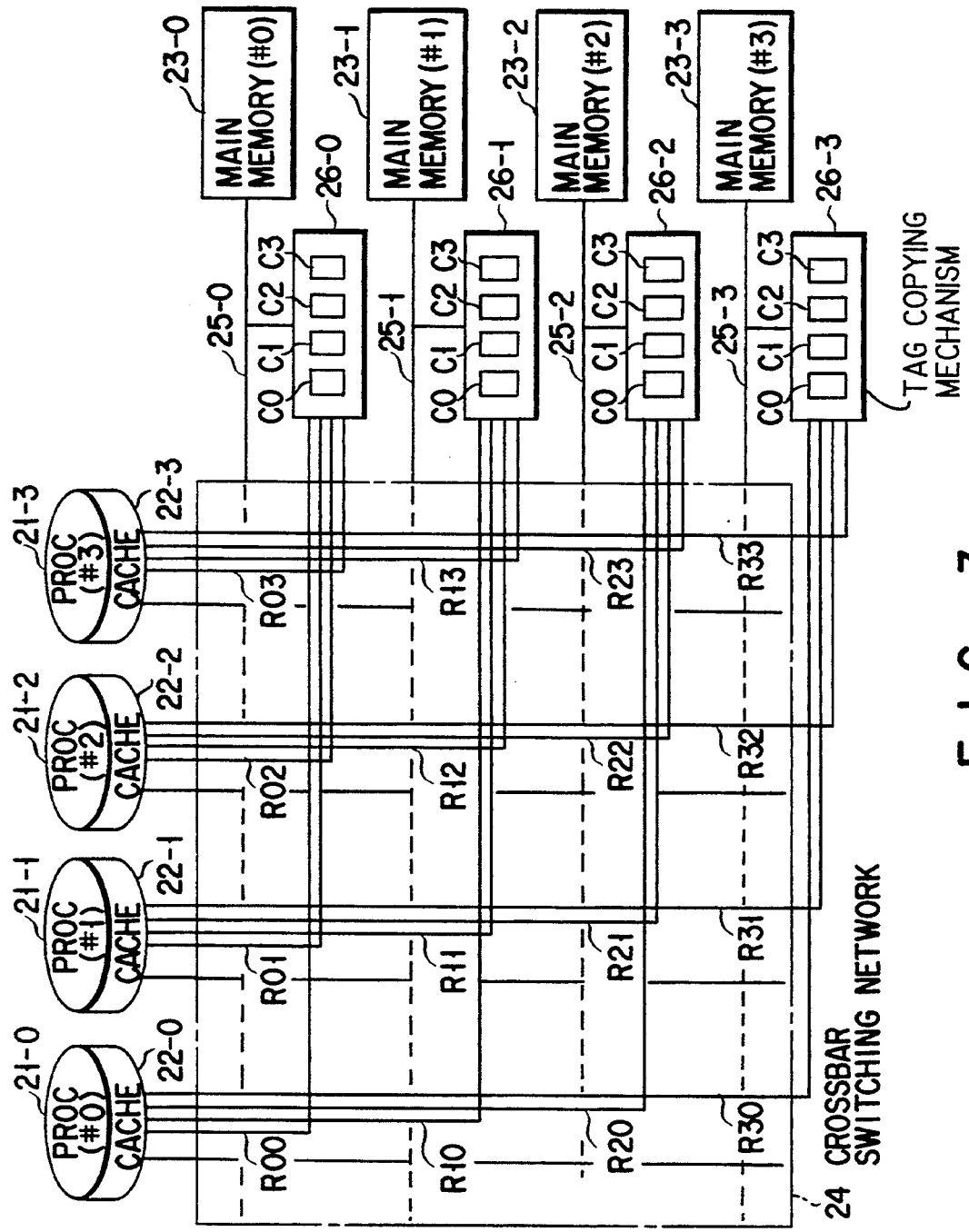
FIG. 3 is a block diagram showing an arrangement of a computer system according to another embodiment of the present invention.

FIG. 3 is a block diagram showing a multi-processor information processing system according to the present invention, which is constituted by four processors and four main memories.

In FIG. 3, reference numerals 21-0 to 21-3 denote processors (#0 to #3); and 22-0 to 22-3, caches (cache memories) incorporated in processors 21-0 to 21-3, respectively. Reference numerals 23-0 to 23-3 denote main memories (#0 to #3) to which different address spaces are assigned; and 24, a crossbar switching network for properly connecting processors 21-1 to 21-3 and main memories 23-0 to 23-3 through crossbar switches, as needed. A system control unit for controlling, the crossbar switches of crossbar switching network 24 according to requests from processors 21-0 to 21-3 is not illustrated in FIG. 3. The connections of the buses through/within the cross-bar switching network are not shown.

Reference numerals 25-0 to 25-3 (connection ports of main memories 23-0 to 23-3 with the crossbar switches) denote signal lines for connecting between main memories 23-0 to 23-1 and the crossbar switches of crossbar switching network 24 for connecting main memories 23-0 to 23-3 to processors 21-i (i=0 to 3); and 26-0 to 26-3, tag copying mechanisms connected to signal lines 25-0 to 25-3. Each tag copying mechanism 26-i (i=0 to 3) has copies (tag copies) C0 to C3 associated with the address space assigned to main memory 23-i, to which corresponding tag copying mechanism 26-i is connected, of tags (not shown) of caches 22-0 to 22-3 incorporated in processors 21-0 to 21-3.

Reference numerals R00 to R03 denote signal lines for transferring cache invalidating information for canceling a given cache line of each of caches 22-0 to 22-3 from tag copying mechanism 26-0 to processors 21-0 to 21-3. Reference numerals R10 to R13 denote signal lines for transferring cache invalidating information from tag copying mechanism 26-1 to processors 21-0 to 21-3. Reference numerals R20 to R23 denote signal lines for transferring cache invalidating information from tag copying mechanism 26-2 to processors 21-0 to 21-3; and R30 to R33, signal lines for transferring cache invalidating information from tag copying mechanism 26-3 to processors 21-0 to 21-3.

In the embodiment of FIG. 1 or 3, assume that the processor #0 executes local processing using only small data which can be wholly stored in the cache #0.

When the program ensures that the processor #1 does not use the result of the above local processing unless the processor #0 completes the execution thereof, no error occurs even if the contents of cache #0 temporarily differ from those of the main memory #0 or #1. In this case, the processor #0 can quickly execute the local processing using only the cache #0, without using the relatively slow bus and slow main memory.

After the result of the local processing has been obtained, the data in the cache #0 is copied back to the corresponding address of the main memory #0 or #1, before other processor #1 accesses the address to which the data in the cache #0 is to be stored. The present invention can be applied to such an embodiment employing the cache copying-back operation.

Incidentally, in the embodiment of FIGS. 1 or 3, bus masters other than microcomputers (CPU, MPU), such as DMA controllers, may be connected to crossbar switching network 24. Even if such a bus master (DMA) is connected, the tag copying units of the present invention can function normally.

As has been described above in detail, according to the present invention, in a multi-processor information processing system constituted by connecting a plurality of main memories and a plurality of processors through a crossbar switching network, a tag copying mechanism having copies of tags of caches of the processors is connected to each main memory, and the tag copies are checked when a corresponding main memory is updated, thereby discriminating whether or not an updating request hits the cache having an original tag. Upon detection of a hit, a cancel or invalidate instruction (and a line number of a hit cache line) is sent to a processor (i.e., the processor which is not a main memory updating request source) corresponding to the cache hit, thereby invalidating the cache line corresponding to the tag of the cache of the processor. Thus, although the crossbar switching network is employed, data consistency between the caches of the processors and the main memories can be maintained. For this reason, the performance of the main memories and the processors having a crossbar connection arrangement can be sufficiently utilized, and a high-performance multi-processor information processing system can be constituted.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A multiprocessor computer system comprising:
   a) first memory means for storing data, a first part of a logical address space of the computer system being assigned to the first memory means;
   b) second memory means for storing data, a second part of the logical address space of the computer system being assigned to the second memory means;
   c) first processor means, which is accessible to either of the first and second parts of the logical address space, for performing a processor operation using the logical address space;
   d) second processor means, which is accessible to either of the first and second parts of the logical address space, for performing a processor operation using the logical address space;
   e) first cache means for, when said first processor means accesses one of said first and second memory means, holding data transferred by an access between said first processor means and one of said first and second memory means, and holding first tag information showing an address to be allocated to the transferred data;

f) second cache means for, when said second processor means accesses one of said first and second memory means, holding data transferred by an access between said second processor means and one of said first and second memory means, and holding second tag information showing an address to be allocated to the transferred data;

g) selectively connecting means for selectively connecting said first processor means to one or both of said first and second memory means, and selectively connecting said second processor means to one or both of said first and second memory means;

h) first tag copying means, coupled to a node between said selectively connecting means and said first memory means, for holding a copy of each of the first and second tag information;

i) second tag copying means, coupled to a node between said selectively connecting means and said second memory means, for holding a copy of each of the first and second tag information;

j) first cache control means, when it is determined from the first tag information held in said first tag copying means that, due to the access to said first memory means, by said second processor means a content of the accessed logical address space differs from a content of said first cache means, for preventing said first processor means from using the content of said first cache means; and k) second cache control means, when it is determined from the second tag information held in said second tag copying means that, due to the access to said second memory means by said first processor means, a content of the accessed logical address differs from a content of said second cache means, for preventing said second processor means from using the content of said second cache means.

2. A system according to claim 1, wherein said first cache control means includes:

A tag copy means, coupled to said first memory means, for storing a copy of an address part of the first tag information;

A tag comparison means for comparing address information of the address accessed by said second processor means with the address part stored in said A tag copy means so as to generate a first signal when the address information corresponds to the address part; and means for invalidating the held by said first cache means first tag information when said A tag comparison means generates the first signal, said second processor means performs a writing access to said first or second memory means.

3. A system according to claim 1, wherein said first processor means supplies said first cache means with first processor information serving to identify said first processor means when said first processor means accesses the logical address space, and said first cache control means includes:

A tag copy means, coupled to said first memory means, for storing a copy of an address part of the first tag information;

A tag comparison means for comparing address information of the address accessed by said second processor means with the address part stored in said A tag copy means so as to generate a first signal when the address information corresponds to the address part;

processor check means for comparing a predetermined processor information with the first processor information so that a second signal is generated when the predetermined processor information matches the first process information, and so that a third signal is generated when the predetermined processor information differs from the first processor information; and means for invalidating the of said first cache means first tag information when said A tag comparison means generates the first signal and said processor check means generates the third signal, and if said second processor means performs a writing access to said first or second memory means.

4. A system according to claim 1, wherein said first cache control means includes:

A tag copy means, coupled to said first memory means, for storing a copy of an address part of the first tag information;

A tag comparison means for comparing address information of the address accessed by said second processor means with the address part stored in said A tag copy means so as to generate a first signal when the address information corresponds to the address part;

V tag copy means, coupled to said first memory means, for storing a copy of a valid bit portion of the first tag information so as to generate a valid signal; and means for invalidating the of said first cache means first tag information when said A tag comparison means generates the first signal and said V tag copy means the valid signal, and if said second processor means performs a writing access to said first or second memory means.

5. A system according to claim 1, wherein said first processor means supplies said first cache means with first processor information serving to identify said first processor means when said first processor means accesses the logical address space, and said first cache control means includes:

"A" tag copy means, coupled to said first memory means, for storing a copy of an address part of the first tag information;

A tag comparison means for comparing address information of the address accessed by said second processor means with the address part stored in said A tag copy means so as to generate a first signal when the address information corresponds to the address part;

processor check means for comparing a predetermined processor information with the first processor information so that a second signal is generated when the predetermined processor information matches the first processor information and so that a third signal is generated when the predetermined processor information differs from the first processor information; and means for copying the address part of the first tag information to said A tag copy means when said processor check means generates the second signal, and if said first processor means performs a reading access to said first or second memory means;

V tag copy means, coupled to said first memory means, for storing a copy of a valid bit portion of the first tag information so as to generate a valid signal; and means for invalidating the of said first cache means first tag information when said A tag comparison means generates the first signal, said V tag copy means the valid signal, and said processor check means generates the third signal, and if said second processor means performs a writing access to said first or second memory means.

6. A system according to claim 1, wherein said first processor means supplies said first cache means with first processor information serving to identify said first processor means when said first processor means accesses the logical address space, and said first cache control means includes:

A tag copy means, coupled to said first memory means, for storing a copy of an address part of the first tag information;

"A" tag comparison means for comparing address information of the address accessed by said second processor means with the address part stored in said A tag copy means so as to generate a first signal when the address information corresponds to the address part;

processor check means for comparing a predetermined processor information with the first processor information so that a second signal is generated when the predetermined processor information matches the first processor information and so that a third signal is generated when the predetermined processor information differs from the first processor information; and means for copying the address part of the first tag information to said A tag copy means when said processor check means generates the second signal, and if said first processor means performs a reading access to said first or second memory means.

7. A system according to claim 6, wherein said first cache control means further includes:

means for invalidating the of said first cache means first tag information when said A tag comparison means generates the first signal and said processor check means generates the third signal, and if said second processor means performs a writing access to said first or second memory means.

* * * * *